(12) United States Patent
Masutani (10) Patent No.: US 8,113,575 B2
(45) Date of Patent: Feb. 14, 2012

(54) VEHICLE SEAT (75) Inventor: Eiji Masutani, Tochigi-ken (JP)

(73) Assignee: TS Tech Co., Ltd., Saitama-Ken (JP)

( * ) Notice: Subject to any disclaimer, the term of this patent is extended or adjusted under 35 U.S.C. 154(b) by 0 days.

(21) Appl. No.: 12/916,966

(22) Filed: Nov. 1, 2010

(65) Prior Publication Data
US 2011/0156457 A1   Jun. 30, 2011

(51) Int. Cl.
*B60N 2/42* (2006.01)
*B60N 2/427* (2006.01)

(52) U.S. Cl. .......... 297/216.1; 297/216.15; 297/216.16; 297/216.17; 297/216.18; 297/216.19

(58) Field of Classification Search .............. 297/216.1, 297/216.15, 216.16, 216.17, 216.18, 216.19
See application file for complete search history.

(56) References Cited

U.S. PATENT DOCUMENTS

| | | | | |
|---|---|---|---|---|
| 4,488,754 A * | 12/1984 | Heesch et al. | ............ | 297/216.18 |
| 4,712,834 A * | 12/1987 | Warrick | ............... | 297/216.17 X |
| 4,738,485 A * | 4/1988 | Rumpf | ...................... | 297/216.19 |
| 4,763,924 A * | 8/1988 | Karlin et al. | ......... | 297/216.18 X |
| 5,226,697 A * | 7/1993 | Borlinghaus et al. | .... | 297/216.18 |
| 5,295,729 A * | 3/1994 | Viano | .................. | 297/216.18 X |
| 5,340,185 A * | 8/1994 | Vollmer | ............... | 297/216.18 X |
| 5,833,313 A * | 11/1998 | Kaneda et al. | ............. | 297/218.1 |
| 5,908,219 A * | 6/1999 | Bohmler | ...................... | 297/216.1 |
| 6,050,635 A * | 4/2000 | Pajon et al. | ................. | 297/216.1 |
| 6,076,887 A * | 6/2000 | Andersson | ................. | 297/216.1 |
| RE37,123 E * | 4/2001 | Templin et al. | .......... | 297/216.17 |
| 6,257,663 B1 * | 7/2001 | Swierczewski | .......... | 297/216.19 |
| 6,386,631 B1 * | 5/2002 | Masuda et al. | ............. | 297/216.1 |
| 6,604,599 B2 * | 8/2003 | Yamaguchi et al. | ... | 297/216.1 X |
| 6,629,575 B2 * | 10/2003 | Nikolov | .................... | 297/216.1 X |
| 6,648,409 B1 * | 11/2003 | Laporte | ...................... | 297/216.1 |
| 6,746,077 B2 * | 6/2004 | Klukowski | .................... | 297/216.1 |
| 6,755,469 B2 * | 6/2004 | Akaike et al. | .......... | 297/216.15 X |
| 6,921,133 B2 * | 7/2005 | Taoka et al. | ............... | 297/216.16 |
| 6,935,684 B2 * | 8/2005 | Sakai | ........................ | 297/216.1 |
| 7,036,878 B2 * | 5/2006 | Masutani | .................... | 297/216.1 |
| 7,229,133 B2 * | 6/2007 | Maddelein et al. | .... | 297/216.1 X |
| 7,341,645 B2 * | 3/2008 | Fong | ..................... | 297/216.16 X |
| 7,413,246 B2 * | 8/2008 | Saiguchi et al. | ........ | 297/216.1 X |
| 7,585,024 B2 * | 9/2009 | Rogers | ...................... | 297/216.17 |
| 7,780,230 B2 * | 8/2010 | Serber | ...................... | 297/216.15 |
| 2003/0160483 A1 * | 8/2003 | Becker et al. | ............ | 297/216.16 |
| 2006/0220426 A1 * | 10/2006 | Moffatt et al. | ............ | 297/216.19 |
| 2010/0001559 A1 * | 1/2010 | Masutani | .................... | 297/216.1 |
| 2011/0089727 A1 * | 4/2011 | Masutani | .................... | 297/216.1 |

(Continued)

FOREIGN PATENT DOCUMENTS

JP           06255413 A  *  9/1994  .............. 297/216.18

(Continued)

*Primary Examiner* — Rodney B White
(74) *Attorney, Agent, or Firm* — Browdy and Neimark, PLLC (57) ABSTRACT

A seat frame 51 is mounted on a body freely movably back and forth. The frame 51 moves backward by leaving a backrest seat 2 by a pretensioner device 10. A front portion of a spring material 71 supporting a cushion material 62 of the seat 3 is arranged on the front portion of the seat frame 51. A rear-side portion of the spring material 71 is mounted on a rear-side spring mounting member 72 below the backrest seat 2. The mounting member 72 is immovable and extends in a lateral direction. A rear position of a cushion material 62 does not move even if the seat moves backward.

10 Claims, 7 Drawing Sheets

U.S. PATENT DOCUMENTS

| | | | |
|---|---|---|---|
| 2011/0121620 A1* | 5/2011 | Masutani | 297/216.1 |
| 2011/0121621 A1* | 5/2011 | Masutani | 297/216.1 |
| 2011/0156457 A1* | 6/2011 | Masutani | 297/216.1 |
| 2011/0198910 A1* | 8/2011 | Masutani | 297/480 |
| 2011/0210586 A1* | 9/2011 | Masutani | 297/216.1 |

FOREIGN PATENT DOCUMENTS

| | | |
|---|---|---|
| JP | 2008-213546 A1 | 9/2008 |

* cited by examiner

VEHICLE SEAT

TECHNICAL FIELD

The present invention provides a vehicle seat having a pretensioner device that satisfactorily binds a seated passenger when a vehicle collides.

BACKGROUND ART

A configuration in which a seat is moved backward by transmitting adversive movement caused by a mutual reaction force between a cylinder and a piston of a pretensioner device through a wire cable has been known (Patent Document 1).
[Patent Document 1] JP 2008-213546A

DISCLOSURE OF THE INVENTION

Problems to be Solved by the Invention

The above publicly known example has a configuration in which a pretensioner device is caused to activate to move a seat backward by transmitting adversive movement caused by a mutual reaction force between a cylinder and a piston of the pretensioner device through a wire cable and thus, while the configuration of the pretensioner device is made simpler, there is a problem that it is necessary to secure a space to allow the seat to move backward.

Therefore, there is a problem that a space for feet of a passenger seated in a rear seat is narrow, causing a sense of oppression for the passenger seated in the rear seat.

The present application improves a sense of seating in the rear seat of vehicle seats provided with a binding device while maintaining a binding effect of a passenger in a front seat unchanged by devising the seat and the movement configuration of the seat.

Means for Solving Problems

The present invention provides a vehicle seat including: a backrest seat 2 and a seat 3, wherein a seat frame 51 of the seat 3 is mounted freely movably back and forth with respect to a fixing frame 46 mounted on one of a body and a slide rail 5, the seat frame 51 is configured to move backward by a pretensioner device 10 activated by an impact received by the body by leaving the backrest seat 2, a front portion of a spring material 71 supporting a cushion material 62 of the seat 3 is mounted on the front portion of the seat frame 51, a rear-side portion of the spring material 71 is mounted on a rear-side spring mounting member 72 in a lateral direction whose position is fixed below the backrest seat 2, and the cushion material 62 of the seat 3 is configured so that even if the seat 3 moves backward, a rear position of the cushion material 62 does not move.

The present invention also provides a vehicle seat including: a backrest seat 2 and a seat 3, wherein a seat frame 51 of the seat 3 is mounted freely movably back and forth with respect to a fixing frame 46 mounted on one of a body and a slide rail 5, the seat frame 51 is configured to move backward by a pretensioner device 10 activated by an impact received by the body by leaving the backrest seat 2, the seat frame 51 is constituted by a front side of a pair of left and right lateral members 55 being coupled by a coupling member 70, a rear-side spring mounting member 72 in a lateral direction is provided in a predetermined portion of the fixing frame 46 on a rear side from the coupling member 70 spaced by a predetermined distance, a plurality of spring materials 71 in a back-and-forth direction is arranged side by side in the lateral direction between the rear-side spring mounting member 72 and the coupling member 70, and a cushion material 62 is provided on the spring materials 71.

Effect of the Invention

According to the present invention, a front portion of the seat 3 is moved backward so that improvement of the binding effect by the backward movement of the seat 3 and improvement of a sense of seating of a passenger seated in the rear seat can be made compatible.

According to the present invention, a rear portion of a spring material 71 is mounted on a rear-side spring mounting member 72 on a rear side from a coupling member 70 spaced by a predetermined distance and therefore, while the front portion of a cushion material 62 of the seat 3 moves backward, a rear-side portion of the cushion material 62 does not move with respect to a backrest seat 2 and improvement of the binding effect by the backward movement of the seat 3 and improvement of a sense of seating of a passenger seated in the rear seat can be made compatible.

According to the present invention, a seat frame 51 constituted by a front side of left and right lateral members 55 being coupled by the coupling member 70 is moved backward and therefore, when compared with movement of the cushion material 62 only, the seat frame 51 and the cushion material 62 are integrally moved backward and while the overall amount of movement of the seat 3 is made smaller for a passenger seated in the rear seat, a surrounding space of a passenger in the rear seat is widened and particularly, a space for feet of a passenger in the rear seat can be made wider so that the binding effect of a passenger in the front seat can be improved while improving a sense of seating of a passenger seated in the rear seat.

According to the present invention, the binding effect of a seated passenger can be improved by making movement of the seat frame 51 smoother by a mounting hole 56 and a mounting member 57.

According to the present invention, a pretensioner device 10 can be configured in such a way that the seat 3 is moved backward by transmitting movement caused by a reaction force of a piston 12 of one cylinder 11 and a cylinder case 11A through a wire cable 13 so that an installation space of the pretensioner device 10 can be made smaller and an intrusion space of the seat 3 into the surrounding space of a passenger in the rear seat can be made "zero" or as small as possible.

According to the present invention, the seat 3 can be moved backward even though a towing direction of the wire cable 13 by the piston 12 and the cylinder case 11A is a lateral direction and therefore, the pretensioner device 10 can be provided by making effective use of a space below the seat 3, which makes the configuration reasonable.

According to the present invention, the cylinder case 11A of the cylinder 11 is supported by the wire cable 13, which eliminates the need to specifically prepare a dedicated mounting member, makes the mounting work of the cylinder 11 easier, and reduces the weight and cost of the cylinder 11.

BEST MODE FOR CARRYING OUT THE INVENTION

An embodiment of the present invention will be described with reference to drawings. Reference numeral 1 is a vehicle seat, reference numeral 2 is a backrest seat of the vehicle seat 1, reference numeral 3 is a seat, reference numeral 4 is a headrest provided in an upper portion of the backrest seat 2, and reference numeral 5 is a slide rail that moves the vehicle seat 1 with respect to the body.

The vehicle seat 1 is provided with the pretensioner device 10 of a moving device K that moves the seat 3 backward while leaving the backrest seat 2 intact by generating a large quantity of gas through ignition of a gas forming agent.

Figure 2:
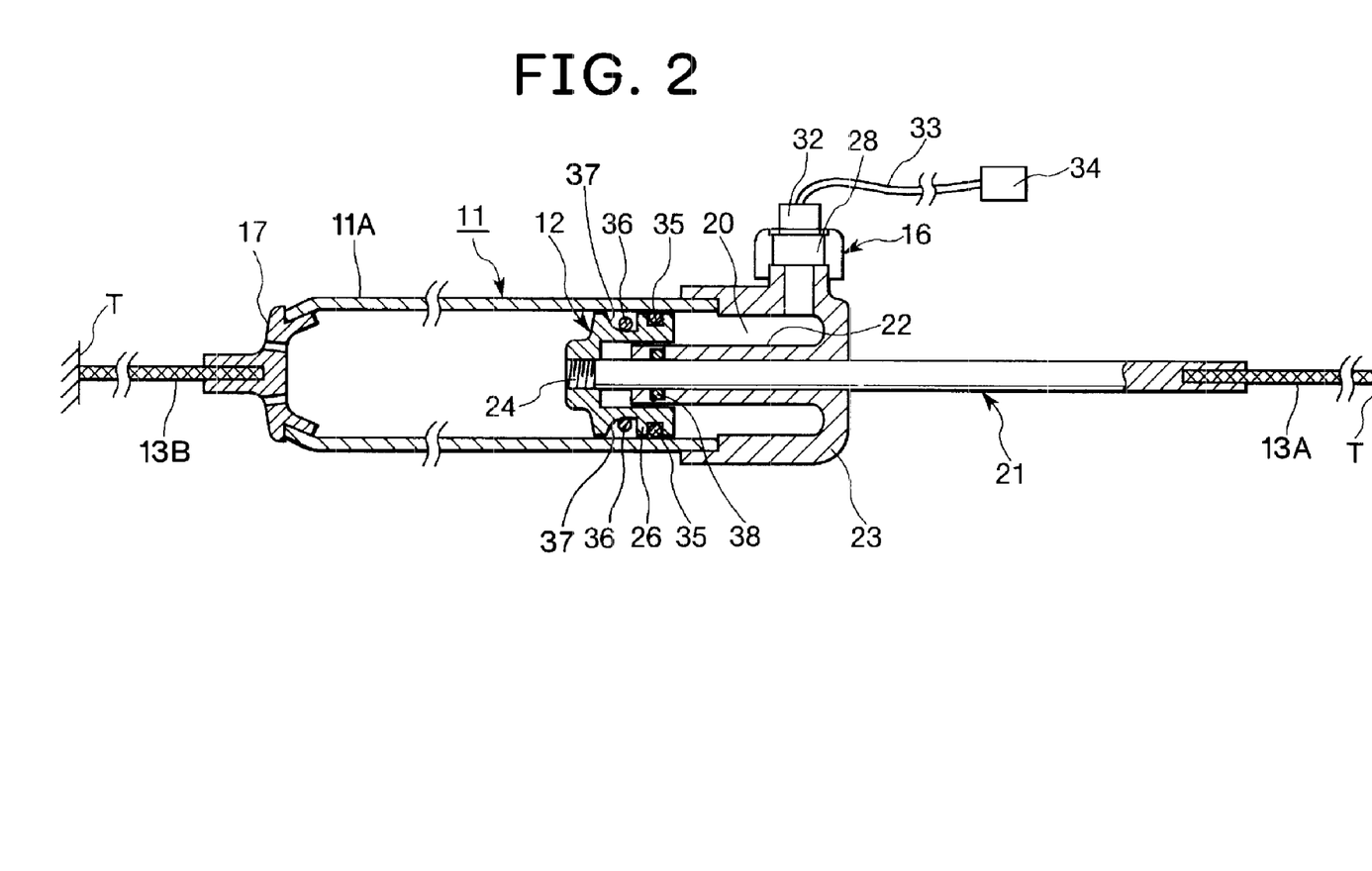
FIG. 2 is a sectional view of an example of a pretensioner device.

The pretensioner device 10 is provided with a piston 12 inside a cylinder case 11A of a cylinder 11. An end of one of a pair of a one side cable 13A and another side cable 13B of the wire cable 13 is connected to the side of the piston 12 inside the cylinder case 11A. The end of the other of the one side cable 13A and the other side cable 13B is connected to a cylinder-side wire locking unit 17 of the cylinder case 11A of the cylinder 11.

The other end of each of the one side cable 13A and the other side cable 13B is connected to any locking unit T of the vehicle seat 1.

The cylinder 11 is freely movably mounted on a predetermined fixing portion of the vehicle seat 1 so that the cylinder case 11A and the piston 12 each move in directions opposite to each other due to a reaction force.

The cylinder case 11A is provided with a gas generator 16 that supplies a large quantity of gas to move the piston 12. Any configuration may be adopted for the gas generator 16 and the gas generator 16 is provided outside the cylinder case 11A.

Though not illustrated, the gas generator 16 contains a gas forming agent to generate a gas therein and is configured to move the piston 12 by gas pressure of a high pressure gas generated from the gas forming agent.

The gas generator 16 is provided on an outside surface of an end of the cylinder case 11A provided on the opposite side of the cylinder-side wire locking unit 17. The gas generator 16 is made to face a gas jetting chamber 20 inside the cylinder case 11A. The piston 12 is made to face the gas jetting chamber 20 and a piston rod 21 is mounted on the piston 12. The wire cable 13 is connected to the piston rod 21. Thus, the wire cable 13 is connected to the piston 12 via the piston rod 21.

Figure 3:
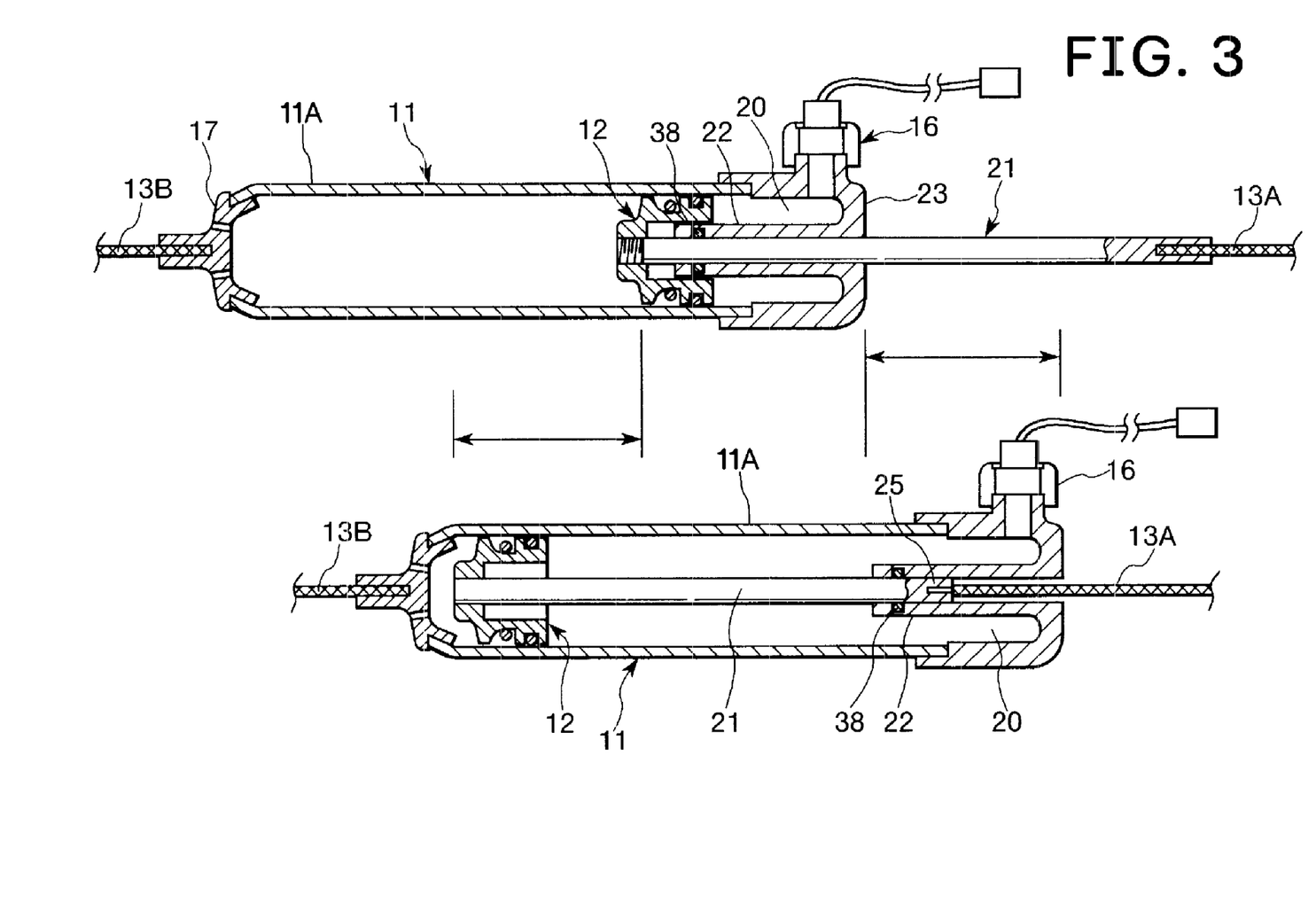
FIG. 3 is a schematic view showing a movement state of a cylinder and piston of the pretensioner device and the movement state of a cable.
Figure 4:
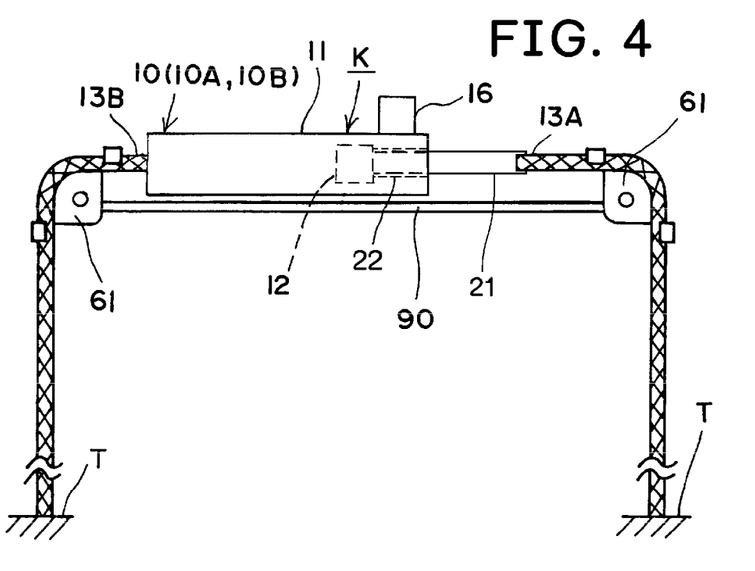
FIG. 4 is a schematic view showing an example of arrangement of the pretensioner device and a cable guide.

The piston rod 21 is freely movably mounted on the cylinder 11. In the embodiment, the piston rod 21 is freely movably inserted into an internal cylinder member (seal extension unit) 22 of the cylinder 11. The base of the internal cylinder member 22 is mounted on the cylinder 11 and the tip of the internal cylinder member 22 is made to open inside the gas jetting chamber 20. While the internal cylinder member 22 is formed integrally with a micro gas generator housing 23 and the tip of the internal cylinder member 22 is positioned in a predetermined location inside the cylinder 11 in FIGS. 2 and 3, the tip may be positioned anywhere inside the cylinder 11 and any configuration may be adopted for the internal cylinder member 22, which may also be formed separately from the micro gas generator housing 23.

If an O ring 38 is provided on an inner circumference at the tip of the internal cylinder member 22 (FIG. 3), the O ring 38 is brought into close contact with the outside surface of the piston rod 21 so that adhesiveness between the moving piston rod 21 and the O ring 38 of the internal cylinder member 22 is improved, preventing leakage of a gas generated by the gas generator 16 from the cylinder case 11A as much as possible.

The piston rod 21 connected to the one side cable 13A is closely inserted into the internal cylinder member 22 and the piston 12 is mounted on the piston rod 21 projecting from the internal cylinder member 22. The piston 12 is freely movably provided inside the cylinder case 11A. A rod mounting portion 24 is provided on the piston 12 and a screw portion formed on an end of the piston rod 21 is screwed into the rod mounting portion 24 to mount the piston 12 on the piston rod 21.

A major diameter portion 26 slidingly in contact with the inner circumference of the cylinder case 11A is formed on an outer circumference of the fitting cylinder member 21. The major diameter portion 26 blocks the side of the cylinder-side wire locking unit 17 of the cylinder case 11A.

A coupler 32 is connected to the gas generator 16. A harness 33 connected to the coupler 32 is connected to an impact detection device 34 provided in a body desired position. When the impact detection device 34 detects an impact, the gas generator 16 generates a large quantity of gas, fills the gas jetting chamber 20 inside the cylinder case 11A with the large quantity of gas, and tows the wire cable 13 by instantaneously moving the piston 12 with gas pressure at this time to activate the pretensioner device 10.

An O ring 35 is provided on the major diameter portion 26 of the piston 12. An inclined surface 37 with a gradually decreasing diameter is formed on the major diameter portion 26 of the piston 12 from the major diameter portion 26 toward the cylinder-side wire locking unit 17 to contain a rigid sphere 36 for a stopper to stop return movement of the piston 12 in a space between the inclined surface 37 and an inner circumferential surface of the cylinder case 11A.

Any concrete configuration can be adopted for the pretensioner device 10. For example, a pair of left and right fixing frames 46 are each mounted on left and right upper rails 35A of the slide rails 5 provided in a body and a seat frame 51 of the seat 3 is mounted on the left and right fixing frames 46 backward movably within a predetermined range.

Thus, the fixing frame 46 is set as a locking unit T and the bases of the one side cable 13A and the other side cable 13B of the pair of left and right wire cables 13 are each connected to the fixing frames 46.

One of tips of the one side cable 13A and the other side cable 13B of the wire cables 13 is connected to the piston rod 21 of the piston 12 provided inside the cylinder case 11A of the cylinder 11 of the pretensioner device 10 and the other tip of the one side cable 13A and the other side cable 13B is connected to an end of the cylinder case 11A.

The pretensioner device 10 moves the seat 3 backward by towing each of the one side cable 13A and the other side cable 13B of the wire cables 13 by one cylinder 11 constituted of one cylinder case 11A and one piston 12 and also towing the seat frame 51 substantially simultaneously.

Figure 1:
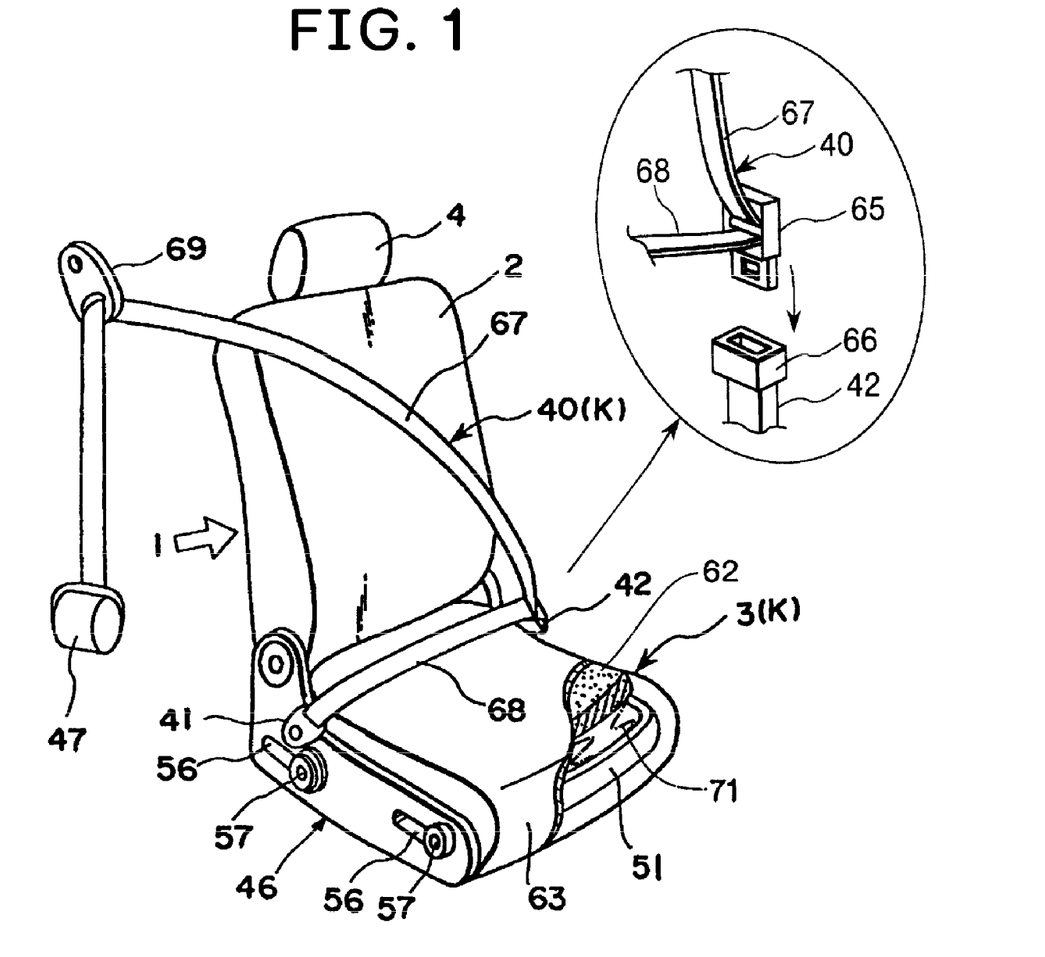
FIG. 1 is a perspective view of a vehicle seat and seat belt, a tongue plate, and an inner lap anchor.

In this case, if the bases of an anchor plates 41 and an inner lap anchor 42 of the left and right of a seat belt 40 are mounted on the left and right fixing frames 46, the seat belt 40 can be pretensioned as the seat 3 moves backward, improving the binding effect.

The cylinder case 11A of the cylinder 11 of the pretensioner device 10 is positioned so that the towing direction of the wire cable 13 and a shaft of the cylinder case 11A are substantially in parallel below the seat frame 51 and configured to be freely movably installed in the shaft direction of the cylinder case 11A, and thus, the pretensioner device 10 moves the seat 3 backward by the one cylinder 11.

In intermediate positions of the one side cable 13A and the other side cable 13B of the wire cables 13 each locked to the cylinder case 11A or the piston 12 between the left and right fixing frames 46 (locking unit T) and the cylinder case 11A, cable guides 61 that changes the towing direction of the one side cable 13A and the other side cable 13B towed in the lateral direction by the piston 12 and the cylinder case 11A to a back-and-forth direction are provided so that the seat 3 can be moved backward (FIGS. 4, 7, 8, and 9).

The cylinder case 11A of the pretensioner device 10 is formed to a predetermined length and arranged with a movement space to be able to tow the wire cable 13 between the left and right cable guides 61 as much as necessary.

The diameter and length of the cylinder case 11A and the amount of towing of the wire cable 13 are considered and set so that the amount of movement of the cylinder case 11A falls between the left and right cable guides 61. That is, an interval greater than the amount of movement of the cylinder case 11A may be provided between the cable guide 61 provided in the movement direction of the cylinder case 11A and the end of the cylinder case 11A.

The cylinder case 11A is provided in a suspended state by the one side cable 13A and the other side cable 13B between the left and right cable guides 61. Thus, the cylinder case 11A is supported by the wire cable 13.

Any concrete movement configuration may be adopted for the seat 3. For example, in the embodiment in FIGS. 1 and 5, bar-shaped mounting members 57 are provided in forward/backward portions on both sides of a pair of left and right lateral members 55 of the seat frame 51 and the mounting members 57 are each engaged in mounting holes 56 provided in the fixing frames 46.

Figure 7:
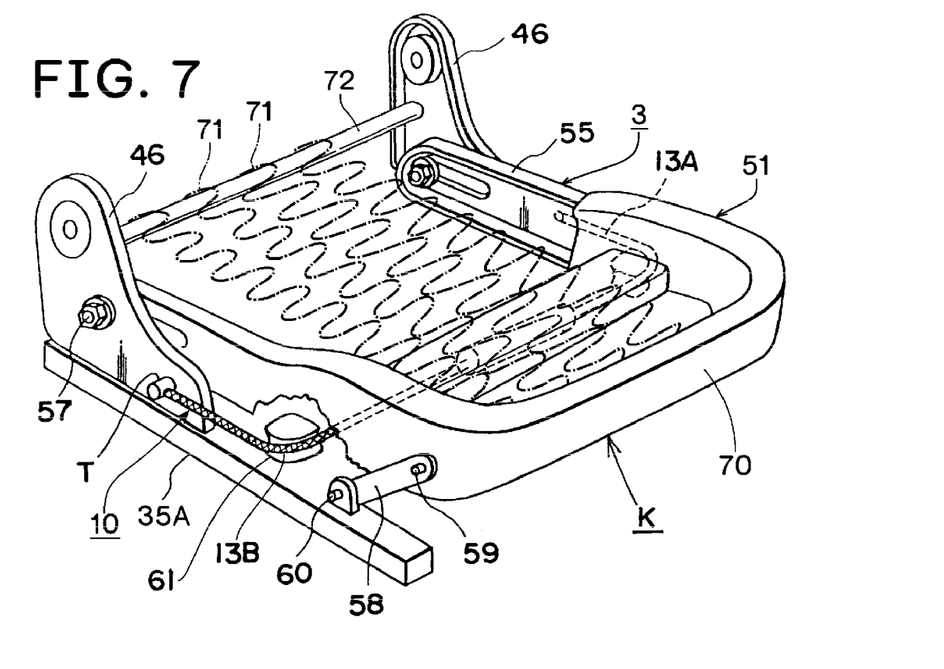
FIG. 7 is a perspective view of the pretensioner device and a seat frame in another embodiment.
Figure 8:
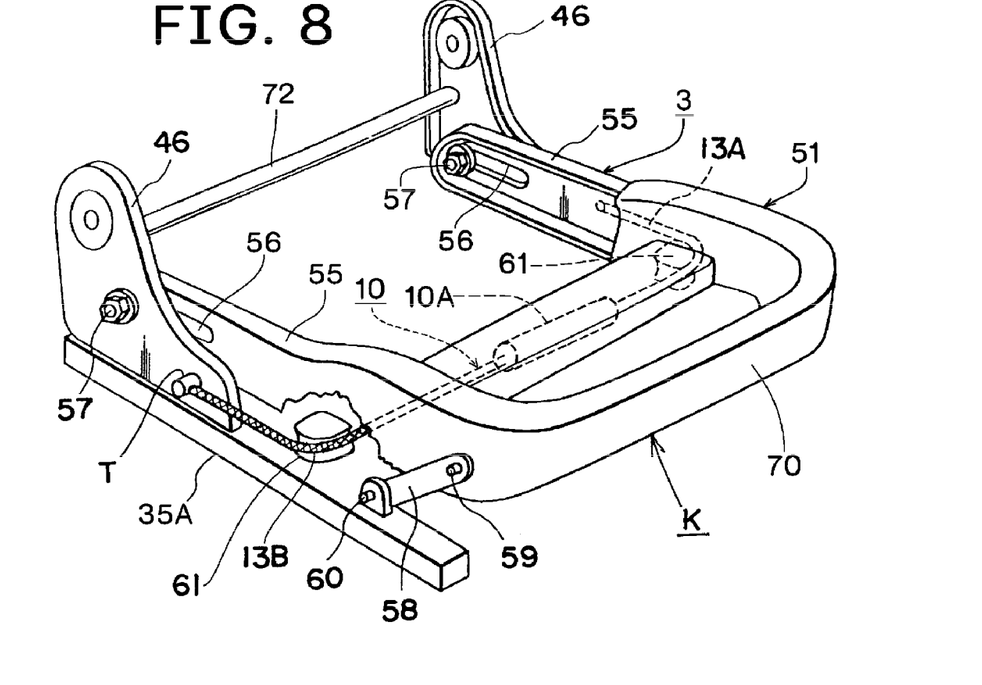
FIG. 8 is a perspective view of the seat frame from which the pretensioner device and a spring material are omitted.
Figure 9:
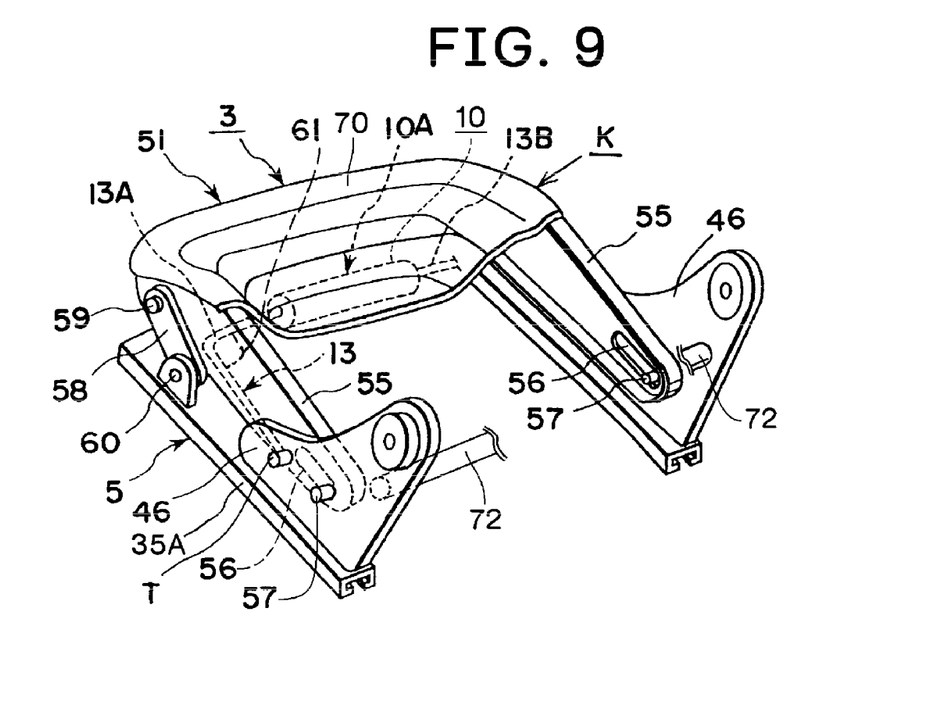
FIG. 9 is a perspective view of the seat frame from which the pretensioner device and the spring material are omitted.
Figure 10:
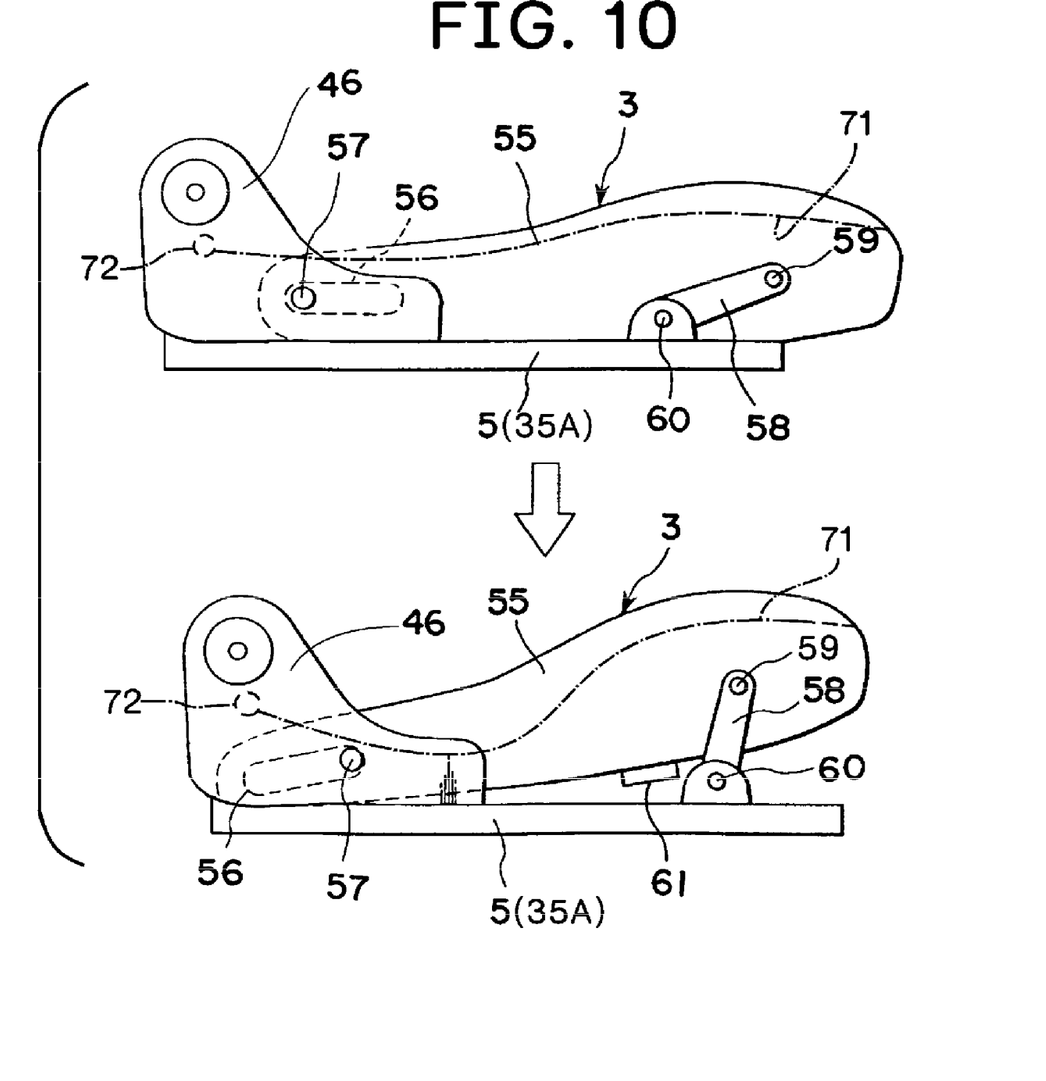
FIG. 10 is a side view of the seat frame in the backward movement state.

In a second embodiment shown in FIGS. 7 to 9, the mounting holes 56 are formed in rear-side portions of the pair of left and right lateral members 55 of the seat frame 51, the bar-shaped mounting members 57 provided in the fixing frames 46 are each engaged in the mounting holes 56, and front portions of the seat frame 51 are mounted, in contrast to the first embodiment, as shown in FIGS. 6 to 9, with an upper portion of an arm 58 being freely rotatably mounted by an axis 59 and a lower portion of the arm 58 being freely rotatably mounted on the fixing frames 46 by an axis 60 without using the mounting holes 56 and the mounting members 57. Thus, when the seat 3 retreats after a collision, the seat 3 can retreat while raising a front end thereof so that the binding effect of the seated passenger by the seat belt 40 can suitably be further improved (FIGS. 7 to 9).

Figure 5:
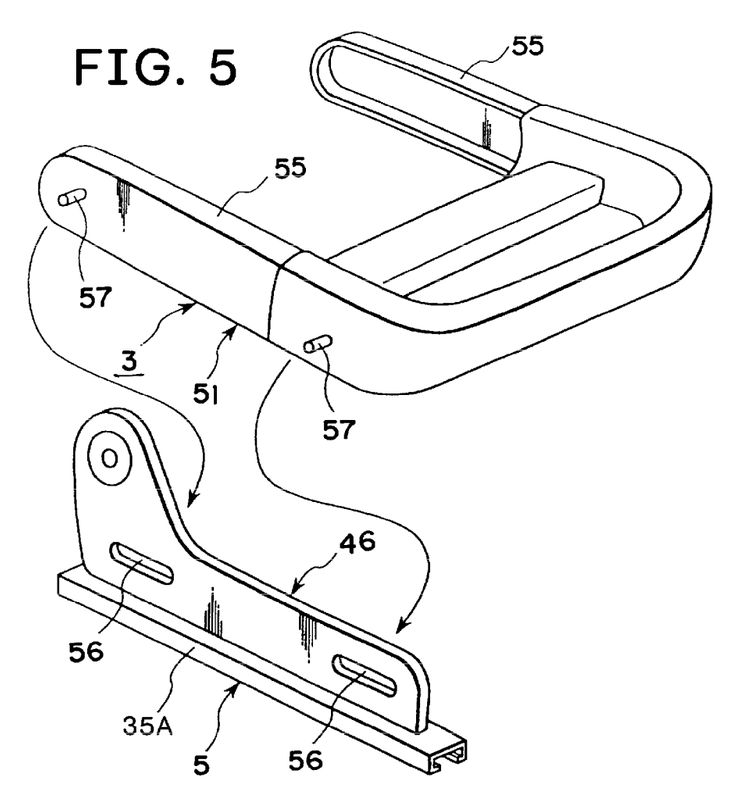
FIG. 5 is a perspective view of a seat frame.
Figure 6:
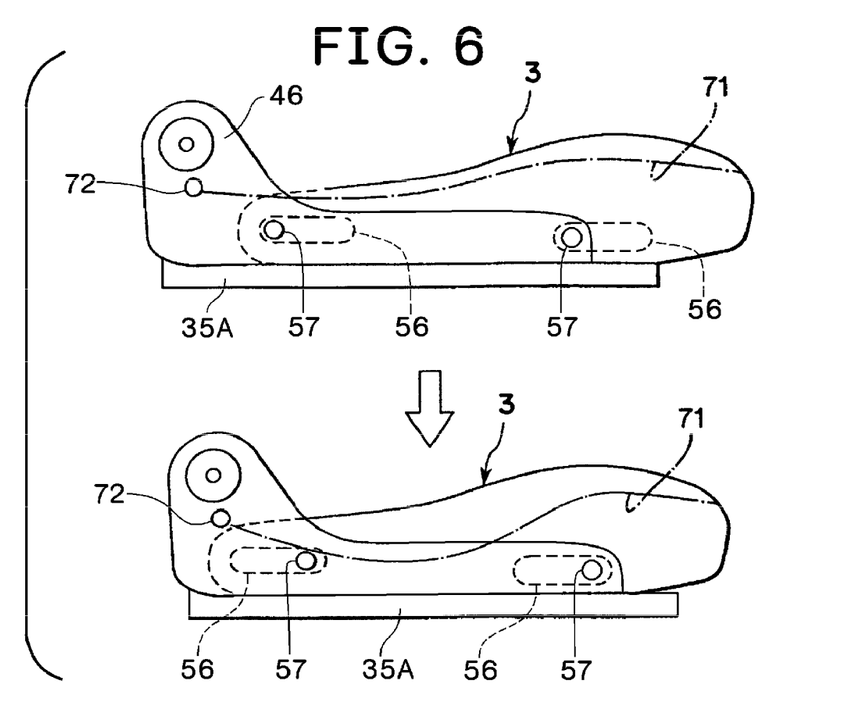
FIG. 6 is a side view of the seat frame in a backward movement state.

The seat frame 51 of the seat 3 is constituted by the front side of the pair of left and right lateral members 55 being coupled by the coupling member 70. A front portion of a spring material 71 in the back-and-forth direction is mounted on the coupling member 70. A plurality of spring materials 71 is placed side by side in the lateral direction. A rear portion of the spring material 71 is mounted on the rear-side spring mounting member 72. The rear-side spring mounting member 72 is formed prolonged in the lateral direction. Left and right ends of the rear-side spring mounting member 72 are fixed to the left and right fixing frames 46.

The cushion material 62 is placed on the rear-side spring mounting member 72 and the outer circumference of the cushion material 62 is encircled with a skin member 63. That is, the front portion of the spring material 71 is mounted on the front portion of the seat frame 51 and the rear-side portion of the spring material 71 is mounted on the rear-side spring mounting member 72 whose position is fixed below the backrest seat 2, and the seat 3 is configured so that the front portion of the seat 3 is moved backward by the pretensioner device 10.

The rear-side spring mounting member 72 is provided on the rear side from the coupling member 70 spaced by a predetermined distance by associating with the back-and-forth length of the cushion material 62 and the cushion material 62 is provided on the spring material 71 between the rear-side spring mounting member 72 and the coupling member 70.

If the rear-side spring mounting member 72 is positioned below the backrest seat 2, the back-and-forth length of the cushion material 62 can suitably be prolonged. If, regarding the rear-side spring mounting member 72 and the left and right lateral members 55, the rear end of the lateral members 55 is positioned toward the front from the rear-side spring mounting member 72 by the distance of backward movement of the seat frame 51, interference between the seat frame 51 and the rear-side spring mounting member 72 can suitably be prevented when the seat 3 moves backward.

If the back-and-forth length of the lateral member 55 is prolonged, rigidity of the seat frame 51 can be improved and movement of the seat frame 51 is made smoother. If at least the height of the rear portion of the length of the seat frame 55 by which the seat 3 moves backward is made lower than the rear-side spring mounting member 72, interference between the seat frame 51 and the rear-side spring mounting member 72 when the seat 3 moves backward can suitably be prevented while improving rigidity of the seat frame 51 by prolonging the back-and-forth length of the lateral members 55 as much as possible.

If the front portion of the spring material 71 is provided in such a way that the front portion of the spring material 71 is higher than the rear-side portion thereof in advance, the spring material 71 can easily be deformed when the seat 3 moves backward so that backward movement of the seat 3 can be made more swift and smoother.

The cushion material 62 is configured so that rear position thereof does not move even if the rear-side portion of the spring material 71 is mounted on the rear-side spring mounting member 72, the rear portion of the spring material 71 is not allowed to move toward the rear beyond the rear-side spring mounting member 72, and the seat 3 moves backward.

In this case, it is only necessary to make the rear position of the cushion material 62 immovable even if the seat 3 moves backward and any configuration may be adopted to move the cushion material 62 backward integrally with the seat frame 51. For example, the skin member 63 may be tied up to the coupling member 70 of the seat frame 51 so that the front portion of the cushion material 62 moves backward integrally with the coupling member 70 due to the skin member 63.

Though not illustrated, if a height adjustment mechanism to adjust the height of the vehicle seat 1 by moving the vehicle seat 1 vertically with respect to the body, the fixing frame 46 moves vertically with respect to the upper rail 35A. Thus, the anchor plates 41 and the inner lap anchor 42 on the left and right sides are mounted on the upper rails 35A, instead of the fixing frames 46, to support the load on the seat belt 40 by the slide rails 5 and also the cable guides 61 and a reinforcing frame 90 are mounted on the side of the upper rails 35A.

Reference numeral 47 is a belt retractor, reference numeral 65 is a tongue plate provided in an intermediate portion of the seat belt 40, and reference numeral 66 is an inner buckle. When the tongue plate 65 is engaged in the inner buckle 66, the seat belt 40 becomes a shoulder belt 67 from a portion near the shoulder of the seated passenger of one end of the belt retractor 47 to the tongue plate 65 and a lap belt 68 from the tongue plate 65 to the anchor plate 41. Reference numeral 69 is a through anchor.

The belt retractor 47 is a publicly known configuration and needs to contain a mechanism that normally allows the seat belt 40 to be withdrawn, but when an impact is felt, locks withdrawal of the seat belt 40.

The tongue plate 65 is also a publicly known configuration and is configured to be freely movable with respect to the seat belt 40, but to be immovable with respect to the seat belt 40 when the seat belt 40 is normally withdrawn.

Operation of the Embodiments

When an impact is received after a collision from the front during traveling while being seated in the vehicle seat 1, an inertial force acts to move the seated passenger forward with respect to the vehicle seat 1, but the seated passenger is bound to the vehicle seat 1 due to the seat belt 40.

However, while the seated passenger is bound by the seat belt 40, there is a limit to improvement of the binding effect by the seat belt 40 during collision. Thus, while attempts have been made to bind the seated passenger by actively pretensioning the seat belt using a pretensioner during collision in recent years, only one side of the left and right of the seat belt is towed according to the conventional configuration to pretension the seat belt and therefore, there is a limit to improvement of the binding effect by moving forward the startup of a binding force still further.

Thus, the moving device K that moves the seat 3 backward is provided in the vehicle seat 1, the vehicle seat 1 or the fixing frame 46 provided in the body is set as the locking unit T, and only the seat 3 is instantaneously moved backward with respect to the fixing framer 46 (the slide rail 5) by the pretensioner device 10 when a collision is detected independent of the seat belt 40 while the backrest seat 2 of the vehicle seat 1 is left intact and therefore, the startup of a binding force is moved forward by moving the seat 3 backward and the binding effect of the seated passenger to the vehicle seat 1 is improved by reducing the amount of movement of the seated passenger.

That is, the binding effect of the seated passenger to the vehicle seat 1 is improved by the seated passenger being supported by the seating surface of the seat 3 moved backward. In this case, only the seat 3 of the vehicle seat 1 is moved backward and the backrest seat 2 is not moved backward and therefore, the volume occupied by the vehicle seat 1 of the rear space can be minimized.

Further, the front portion of the spring material 71 supporting the cushion material 62 is mounted on the front portion of the seat frame 51 and the rear-side portion of the spring material 71 is mounted on the rear-side spring mounting member 72 whose position is fixed and which is below the backrest seat 2 and therefore, the front portion of the seat 3 is moved backward by the pretensioner device 10, but the rear portion thereof is not moved backward and remains below the backrest seat 2, further minimizing the volume occupied by the vehicle seat 1 of the rear space and making improvement of the binding effect by the backward movement of the seat 3 and improvement of a sense of seating of a passenger in the rear seat compatible.

More specifically, the seat frame 51 of the seat 3 is constituted by the front side of the pair of left and right lateral members 55 being coupled by the coupling member 70, the front portion of the spring material 71 in the back-and-forth direction is mounted on the coupling member 70, the rear portion of the spring material 71 is mounted on the rear-side spring mounting member 72, and the left and right ends of the rear-side spring mounting member 72 are each fixed to the fixing frames 46 and therefore, only the rear portion of the pair of left and right lateral members 55 of the seat frame 51 of the seat 3 is moved backward and the rear-side spring mounting member 72 remains below the backrest seat 2 without being moved backward.

Therefore, the rear portion of the spring material 71 does not move toward the rear beyond the rear-side spring mounting member 72 so that the volume occupied by the vehicle seat 1 of the rear space can be minimized.

Since the rear portion of the spring material 71 does not move toward the rear beyond the rear-side spring mounting member 72, the rear position of the cushion material 62 is hardly moved even if the seat 3 is moved backward.

On the other hand, the seat frame 51 constituted by the front side of the left and right lateral members 55 being coupled by the coupling member 70 moves backward and therefore, while the rear position of the cushion material 62 is hardly moved, the front portion of the cushion material 62 is moved backward integrally with the seat frame 51.

Therefore, the overall amount of movement of the seat 3 can be made smaller for a passenger seated in the rear seat, a surrounding space for a passenger seated in the rear seat can be made wider while improving the binding effect by sufficient backward movement of the seat 3, and particularly a space for feet of a passenger seated in the rear seat can be made wider so that improvement of a sense of seating of a passenger seated in the rear seat and improvement of the binding effect of a passenger seated in the front seat can be made compatible.

The rear-side spring mounting member 72 is provided on the rear side from the coupling member 70 spaced by a predetermined distance by associating with the back-and-forth length of the cushion material 62, the cushion material 62 is provided on the spring material 71 between the rear-side spring mounting member 72 and the coupling member 70, the rear-side spring mounting member 72 is positioned below the backrest seat 2 and therefore, the back-and-forth length of the cushion material 62 can be made longer, which can suitably improve a sense of seating by improved cushioning properties.

If the back-and-forth length of the cushion material 62 is made longer, rigidity of the seat frame 51 is improved and therefore, regarding the rear-side spring mounting member 72 and the left and right lateral members 55, if the rear end of the lateral members 55 is arranged toward the front from the rear-side spring mounting member 72 by the distance of backward movement of the seat frame 51, interference between the seat frame 51 and the rear-side spring mounting member 72 can suitably be prevented further when the seat 3 moves backward.

If at least the height of the rear portion of the length of the lateral members 55 by which the seat 3 moves backward is made lower than the rear-side spring mounting member 72, interference between the seat frame 51 and the rear-side spring mounting member 72 when the seat 3 moves backward can be prevented while improving rigidity of the seat frame 51 by prolonging the back-and-forth length of the lateral members 55 as much as possible.

The bar-shaped mounting members 57 are provided in the forward/backward portions on both sides of the pair of left and right lateral members 55 of the seat frame 51 of the seat 3 and the mounting members 57 are relatively freely movably inserted into the mounting holes 56 provided in the fixing frames 46 and prolonged back and forth and therefore, the seat 3 moves backward with respect to the fixing frame 46 by the seat frame 51 being guided by the mounting members 57 and the mounting holes 56.

In this case, like the second embodiment in FIGS. 7 to 9, the front portion of the seat frame 51 is vertically freely movably mounted to the arm 58 and therefore, when the seat 3 retreats after a collision, the seat 3 can be made to retreat while raising the front end thereof so that the binding effect of the seated passenger by the seat belt 40 can suitably be further improved.

The fixing frame 46 fixed to the slide rail 5 in a fixed state with respect to the body is set as the locking unit T, each end of the one side cable 13A and the other side cable 13B of the pair of left and right wire cables 13 is locked to the fixing frame 46, one of tips of the one side cable 13A and the other side cable 13B of the wire cables 13 is connected to the piston rod 21 of the piston 12 provided inside the cylinder case 11A of the pretensioner device 10 and the other tip of the one side cable 13A and the other side cable 13B is connected to the side of the cylinder case 11A and therefore, when an impact is detected by the impact detection device 34 provided in a body desired position, the pretensioner device 10 moves the seat 3 backward by towing the wire cable 13 and towing the seat frame 51.

The pretensioner device 10 is positioned so that the towing direction of the wire cable 13 and the shaft of the cylinder case 11A are in parallel with respect to the vehicle seat 1 and the cylinder case 11A is arranged freely movably only in the shaft direction of the cylinder case 11A and therefore, a reaction force of the piston 12 that is instantaneously moved by a large quantity of gas by the gas generator 16 acts on the freely movable cylinder case 11A so that the piston 12 and the cylinder case 11A each move in directions opposite to each other.

Consequently, the one side cable 13A locked to the wire cable mounted on the piston rod 21 of the piston 12 and the other side cable 13B connected to the cylinder case 11A become a single-state cable without looseness so that the one side cable 13A and the other side cable 13B are towed substantially simultaneously by substantially the same amount to be able to move the seat frame 51 backward and can be provided at low prices by reducing the number of components of the mechanism to bind a seated passenger.

The cylinder case 11A of the pretensioner device 10 is mounted on a front underside of the seat frame 51, the cable guides 61 are provided in left and right intermediate portions of the seat frame 51, and the one side cable 13A and the other side cable 13B are each turned to the direction of the rear portion of the fixing frame 46 at each of the cable guides 61 before being locked to the rear portion of the fixing frame 46 (locking unit T) and therefore, contact with other components of the vehicle seat 1 when moving in a mutually relatively reducing direction of the one side cable 13A and the other side cable 13B can be prevented satisfactorily and reliably, the amount of movement of the seated passenger is reduced by backward movement of the seat 3, and the binding effect of the seated passenger to the vehicle seat 1 is improved.

The pretensioner device 10 is configured so that one cylinder 11 is arranged below the front underside of the seat frame 51 of the seat 3 and the shaft direction of the cylinder 11 becomes the lateral direction and therefore, a mechanism to bind a seated passenger can be installed without sacrificing foot insertability of the passenger when seated in the rear vehicle seat 1 of the vehicle seat 1 and in addition, the pretensioner device 10 can be activated satisfactorily and reliably.

The cylinder 11 of the pretensioner device 10 is configured to be provided in a suspended state by the pair of the one side cable 13A and the other side cable 13B of the wire cable 13 between the left and right cable guides 61 for belt so as to support the cylinder 11 by the wire cable 13 and therefore, the cylinder case 11A is supported by the wire cable 13, which eliminates the need to specifically prepare a dedicated mounting member and makes the mounting work of the cylinder 11 easier.

The cylinder 11 of the pretensioner device 10 is arranged with a movement space allowing to tow the wire cable 13 as much as necessary and therefore, even if the cylinder case 11A moves due to action of the gas generator 16, the cylinder case 11A is prevented from coming into contact with the cable guide 61 to make activation thereof more reliable.

That is, an interval greater than the amount of movement of the cylinder case 11A itself is provided between the cable guide 61 provided in the movement direction of the cylinder case 11A and the end of the cylinder case 11A and therefore, even if the cylinder case 11A itself moves, the cylinder case 11A is prevented from coming into contact with the cable guide 61.

Each embodiment described above is illustrated and described individually or mixedly, but these embodiments can be combined in various ways and the configuration, operations, and the like are not limited by such representations and naturally cases of achieving a multiplier effect are present.

The invention claimed is:

1. A vehicle seat comprising: a backrest and a seat, the seat comprising a seat frame mounted freely movably back and forth with respect to a fixing frame mounted on one of a body and a slide rail, the seat frame being configured to move backward by a pretensioner device activated by an impact received by the body by leaving the backrest, a front portion of a spring material supporting a cushion material of the seat is mounted on the front portion of the seat frame, a rear-side portion of the spring material is mounted on a rear-side spring mounting member in a lateral direction whose position is fixed below the backrest, and the cushion material of the seat being configured so that even if the seat moves backward, a rear position of the cushion material does not move.

2. The vehicle seat according to claim 1, wherein the pretensioner device moves a piston inside a cylinder case of one cylinder instantaneously by gas pressure of a high pressure gas generated by a gas generator to move the cylinder case by a reaction force caused by movement of the piston so that the cylinder case and the piston move in directions opposite to each other due to the reaction force and the seat is moved backward by transmitting the movement of the cylinder case and the piston through a wire cable.

3. The vehicle seat according to claim 2, wherein the wire cable is constituted of a pair of a one side cable and another side cable, one end of each of the one side cable and the other side cable is connected to a cylinder-side wire locking unit or the side of the piston, the other end of each of the one side cable and the other side cable is connected to the fixing frame, the cylinder case and the fixing frame are each arranged in such a way that a shaft direction of the cylinder case becomes the lateral direction and the fixing frame tows the wire cable in a direction crossing the shaft direction of the cylinder case, and a pair of left and right cable guides that change a movement direction of the wire cable by the cylinder case and the piston from the lateral direction to the back-and-forth direction are provided in intermediate positions of the one side cable and the other side cable between the cylinder case and each of the fixing frames.

4. The vehicle seat according to claim 3, wherein the cylinder case of the cylinder is configured by in a suspended state by the one side cable and the other side cable between the left and right cable guides.

5. A vehicle seat comprising: a backrest and a seat, the seat comprising a seat frame mounted freely movably back and forth with respect to a fixing frame mounted on one of a body and a slide rail, the seat frame being configured to move backward by a pretensioner device activated by an impact received by the body by leaving the backrest, the seat frame being constituted by a front side of a pair of left and right lateral members being coupled by a coupling member, a rear-side spring mounting member in a lateral direction is provided in a predetermined portion of the fixing frame on a rear side from the coupling member spaced by a predetermined distance, a plurality of spring materials in a back-and-forth direction is arranged side by side in the lateral direction between the rear-side spring mounting member and the coupling member, and a cushion material is provided on the spring materials.

6. The vehicle seat according to claim 5, wherein the seat frame is constituted by the front side of the pair of left and right lateral members being coupled by the coupling member and the left and right lateral members are configured so that at least a height of a rear portion of a length by which the seat frame moves backward is made lower than the rear-side spring mounting member.

7. The vehicle seat according to claim 6, further comprising a mounting hole prolonged back and forth in one of the left and right lateral members and the fixing frame and a mounting member that guides backward movement of the seat by being engaged in the mounting hole in the other of the left and right lateral members and the fixing frame.

8. The vehicle seat according to claim 5, wherein the pretensioner device moves a piston inside a cylinder case of one cylinder instantaneously by gas pressure of a high pressure gas generated by a gas generator to move the cylinder case by a reaction force caused by movement of the piston so that the cylinder case and the piston move in directions opposite to each other due to the reaction force and the seat is moved backward by transmitting the movement of the cylinder case and the piston through a wire cable.

9. The vehicle seat according to claim 8, wherein the wire cable is constituted of a pair of a one side cable and another side cable, one end of each of the one side cable and the other side cable is connected to a cylinder-side wire locking unit or the side of the piston, the other end of each of the one side cable and the other side cable is connected to the fixing frame, the cylinder case and the fixing frame are each arranged in such a way that a shaft direction of the cylinder case becomes the lateral direction and the fixing frame tows the wire cable in a direction crossing the shaft direction of the cylinder case, and a pair of left and right cable guides that change a movement direction of the wire cable by the cylinder case and the piston from the lateral direction to the back-and-forth direction are provided in intermediate positions of the one side cable and the other side cable between the cylinder case and each of the fixing frames.

10. The vehicle seat according to claim 9, wherein the cylinder case of the cylinder is configured in a suspended state by the one side cable and the other side cable between the left and right cable guides.

* * * * *